Figure 1:
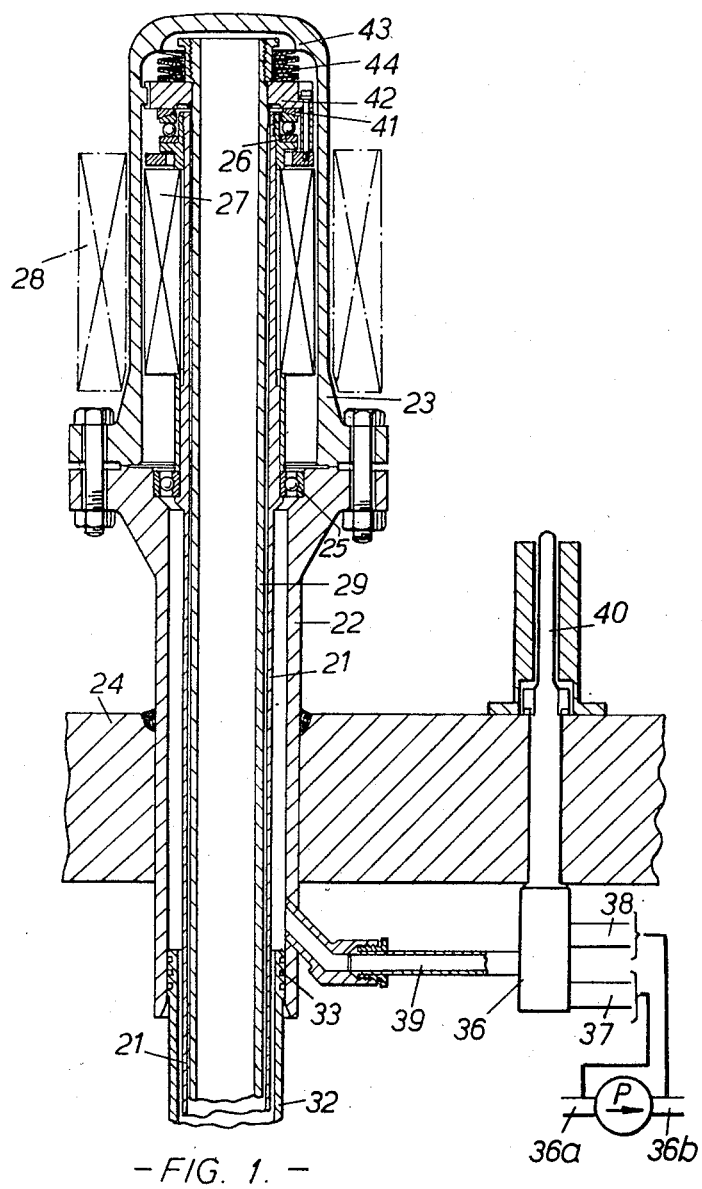

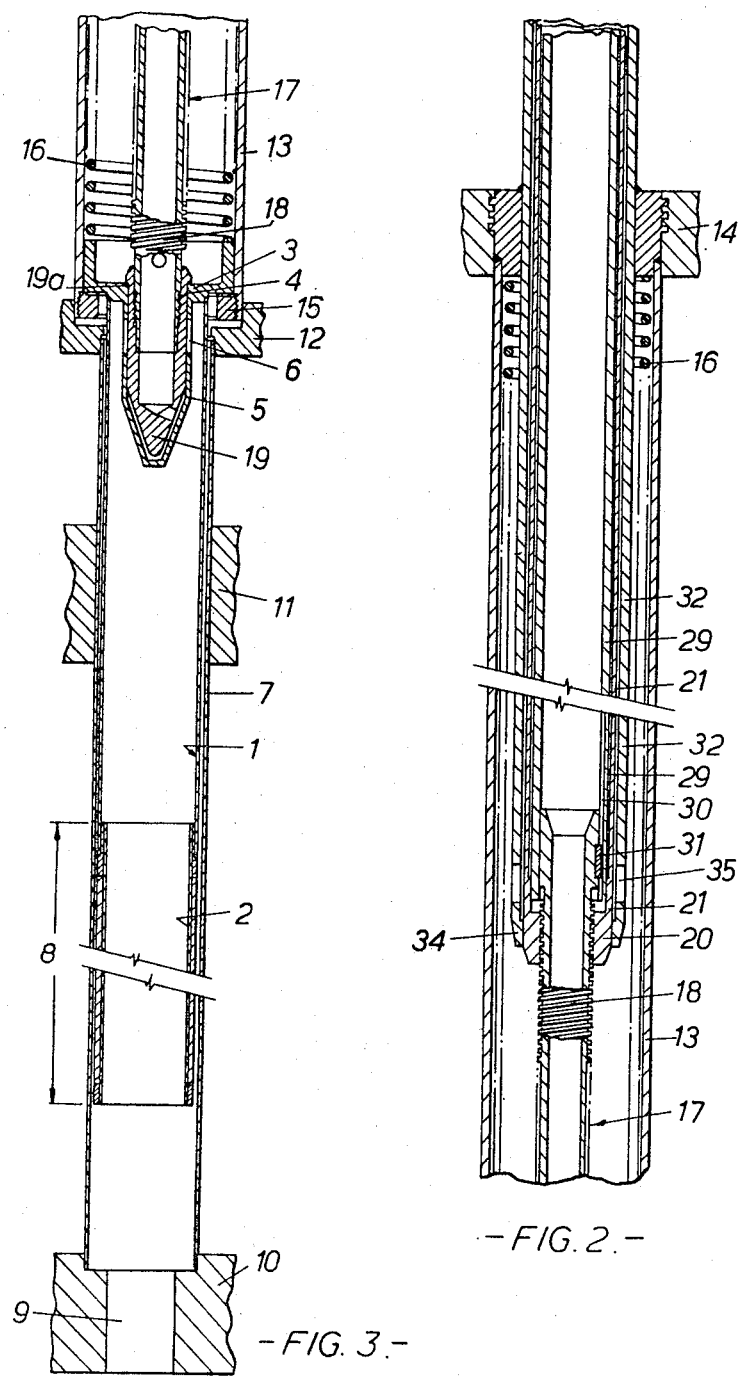

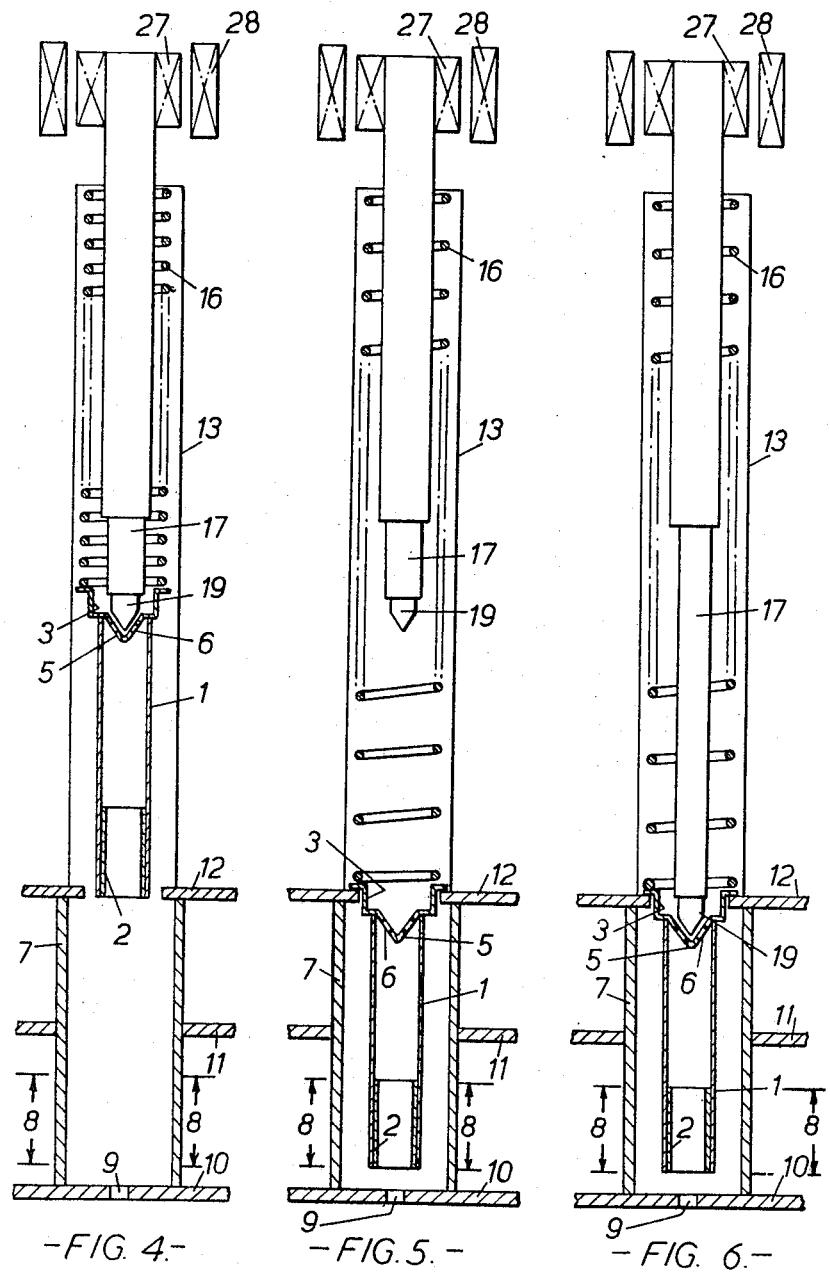

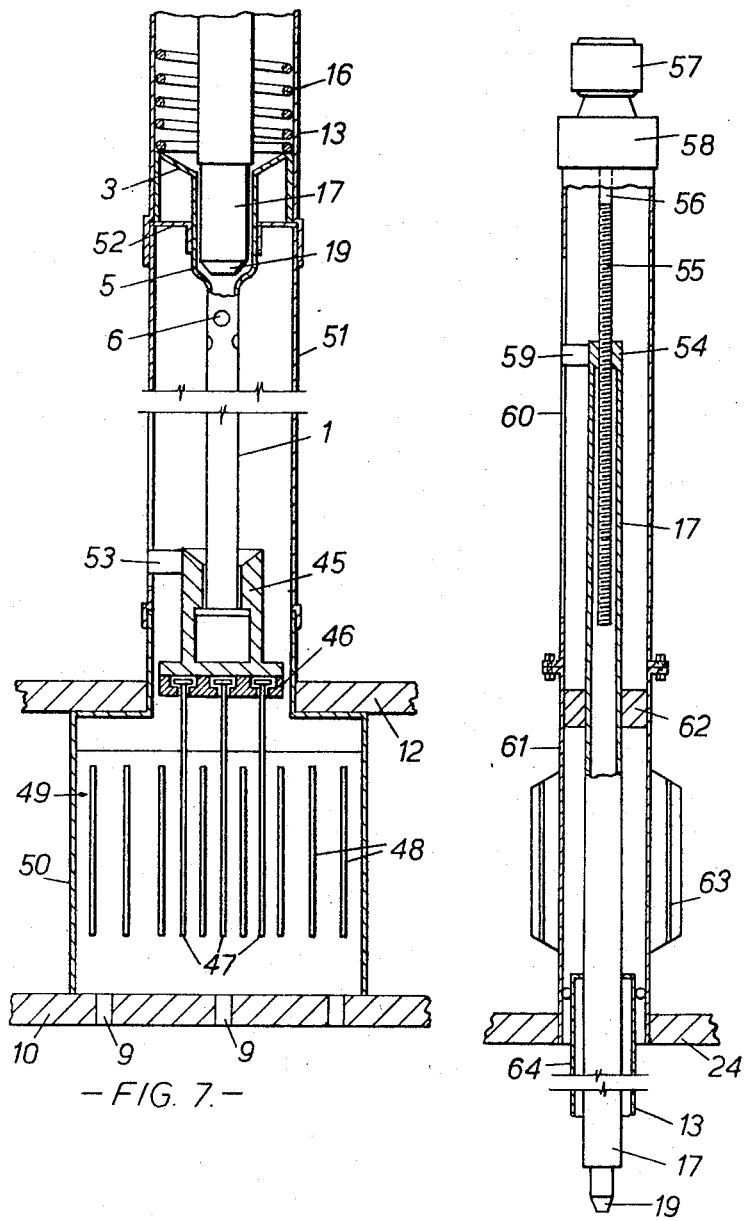

United States Patent Office 3,324,006
Patented June 6, 1967

3,324,006
CONTROL MEMBERS FOR NUCLEAR REACTORS
Ronald Scott Challender and Michael Charles Pugh, Warrington, and William Paul White, Ellesmere Port, England, assignors to United Kingdom Atomic Energy Authority, London, England
Filed Nov. 23, 1964, Ser. No. 413,200
Claims priority, application Great Britain, Dec. 2, 1963, 47,443/63
6 Claims. (Cl. 176—36)

This invention relates to control members for nuclear reactors using a pressurised coolant, and to control mechanisms for use with such reactors.

In such mechanisms the control member is movable with respect to an active core of the reactor, movement of the control member in one direction serving to reduce the reactivity of the core and movement in the opposite direction serving to increase the reactivity of the core.

It is known that a nuclear reactor control member can be moved by pressure differences acting on the member (see for example page 207 of "Nuclear Reactor Control Engineering," Harrer, Van Nostrand, 1963).

The present invention seeks to provide a control mechanism in which a control member can be moved by pressure differences acting on the member and which is inherently safe in operation in a simple, and hence reliable, manner.

According to the invention a control mechanism has a control member, first means to cause the member to move to a reactivity reducing position at a fast rate and second means to cause the member to move from the reactivity reducing position by a force created by a pressure difference across the member at a slow rate regulated by restraining means, said second means being arranged so that with the control member subject to the influence of the restraining means said pressure difference is effective to exert the force on the rod to move it from the reactivity reducing position and with the control member free of said restraining means said pressure difference is reduced to an ineffective level.

The invention provides the advantages that the control member cannot be removed from the reactivity reducing position by inadvertent changes in pressure. Other advantages and features of the invention appear below in the description of embodiments of nuclear reactor control mechanisms in accordance with the invention, given by way of example only, with reference to the accompanying drawings in which:

FIGURES 1–3 are sectional elevations, FIGURE 2 following on below FIGURE 1 and FIGURE 3 following on below FIGURE 2, FIGURES 4–6 are diagrams in elevation of the mechanism of FIGURES 1–3, the components being shown in various operational positions, and FIGURES 7 and 8 are diagrams of alternative forms of some of the components of FIGURES 1 to 6.

FIGURES 1 to 3 show a nuclear reactor control mechanism comprising a tubular control carrier member 1 having secured to it an internal tubular portion 2 of neutron absorbing material (such as for example boron steel) and an upper annular plate 3 having a central aperture 4 bounded by a part tapered projection 5 in the side wall of which are ports 6. The member 1 is shown in a housing 7 and extending into a fuel element core 8 of a pressurised water nuclear reactor. The housing 7 is open to fluid pressure of pressurised coolant water flowing upwardly through the core by way of an aperture 9 in a lower core support plate 10. The housing 7 is secured to the plate 10 and passes through an upper core support plate 11 and is recessed and secured into a core header plate 12. A standpipe 13 is secured to and extends upwardly from the core header plate 12 to be recessed into and secured to a fixed support plate 14. The annular top plate 3 is shown seated on a collar 15 engaging the standpipe 13, the plate 3 being held against the collar 15 by a compression spring 16 extending and acting between a flange on the upper side of the annular top plate 3 and the lower side of the support plate 14. A hollow coaxial stem 17 inside the spring 16 has a screw thread 18 on its external surface, the lower part of the stem 17 having a nosepiece or plug 19 attached to it. The nosepiece 19 has a shoulder 19a shown abutting the upper face of the plate 3. The screw thread 18 interacts at its upper end with a nut 20 integral with a hollow shaft 21. The hollow shaft 21 extends coaxially upwardly within the standpipe 13 and projects into an access pipe 22 which has a bolted and sealed dome 23, the pipe 22 extending through and being sealingly welded to a lid 24 of a pressure vessel enclosing the nuclear reactor and from which the plate 14 is carried. The hollow shaft 21 is aligned within the access pipe 22 by way of a bearing 25 and acts on a thrust bearing 26 in the cap 23. The hollow shaft 21 is connected to an electrical rotor 27 situated within the dome 23, which rotor 27 is coupled electro-magnetically to an associated electrical stator 28 situated outside and mounted on the dome 23. Inside the shaft 21 there is a a fixed coaxial tube 29 which has a longitudinal keyway 30 in which is slidable a key 31 recessed into the stem 17. Surrounding the shaft 21 is a coaxial guide sleeve 32 aligned at its upper end within the access pipe 22 by way of ring seals 33 and at its lower end a slidable fit on the shaft 21 by way of a collar 34 integral with the sleeve 32. The sleeve 32 has liquid pressure vents 35 at its lower end. Pressure within the standpipe 13 can be varied by way of a changeover valve 36 which can switch between reactor coolant pump P inlet side 36a (low pressure) and the pump outlet side 36b (high pressure) to which it is linked by separate lines 37 and 38 respectively. The outlet from the changeover valve 36 is linked to the access pipe 22 by way of a pipe 39. The changeover valve 36 can be activated by an electrical solenoid 40 outside the lid 24.

Within the dome 23 the thrust bearing 26 is carried on a ring 41 carried on an annular thrust plate 42 to which the tube 29 is attached. The thrust plate 42 is resiliently mounted from a shoulder 43 on the dome 23 by way of a series of Belleville washers 44.

It is to be understood that the nuclear reactor incorporates a number of mechanisms of the kind described herein.

The plate 3 is secured to the upper end of the member 1 and the projection 5 of the plate 3 has a hollow cylindrical portion in which the ports 6 are formed and an integral lower portion of part tapered hollow conical form closed off at its bottom end. The projection 5 thus forms a housing shaped to conform generally to the shape of the nosepiece 19 which itself has a hollow cylindrical portion (shown in FIGURE 3 as closing off the ports 6) and an integral conical portion at its bottom end.

In general operational terms the tubular control member 1 can be driven downwards at a fast rate into the core 8 by gravity and the spring 16, but is normally prevented from being so driven by virtue of hydraulic pressure below the member 1 greater than that above the member 1. The pressure difference across the control member 1 is maintained by co-operation between the member 1 and the nosepiece 19 of restraining means in the form of the screwed stem 17 which is powered by the motor 27, 28 and acts on the member 1 at the abutting shoulder 19a of the nosepiece 19. The nosepiece 19 is formed to function as a valve by sliding over the ports 6 in the projection 5 of the annular plate 3 of the member 1. With the stem 17 and member 1 separated or free from each other (as they will be when no pressure difference exists across the member 1 and the spring 16 drives the member 1 into the housing 7) hydraulic pressure below the control member cannot withdraw the member 1 from the core 8 as the valve described above is open. When the plug 19 of the stem 17 and the member 1 are engaged together the valve is closed since the ports 6 are closed and the hydraulic pressure can act to move the member 1 upwards, but only at a slow rate regulated by the controlled rate of movement of the stem 17. The stem 17 can also be used to drive the member 1 into the reactor core 8 in opposition to the hydraulic pressure.

In FIGURES 4, 5 and 6 are shown simplified drawings of the relative operational positions of various members.

FIGURE 4 shows the stem 17 and the member 1 fully retracted.

FIGURE 5 shows the member 1 after it has been driven into the housing 17 by the spring 16 while the stem 17 is still fully retracted.

FIGURE 6 shows the stem 17 driven down within the standpipe 13 so that the stem 17 and the member 1, as described above, have interacted to provide the fluid barrier across the control member 1.

In operational use the portion 2 of the member 1 is normally held out of the reactor core 8 within the standpipe 13 (FIG. 4). The hollow stem 17 is normally screwed up into the hollow shaft 21, the nosepiece 19 being in close proximity to the nut 20, and the valve 36 is open to line 37 linked to the reactor coolant pump inlet pressure. Thus the plate 3 and projection 5 are in contact with the nosepiece 19 so that the ports 6 are closed. The member 1 is held in this position by the action of the core coolant pressure (effectively main pump outlet pressure i.e. high pressure) acting on the under side of the annular top plate 3, the projection 5 and the lower rim of the member 1. The pressure is sufficient to hold up the member 1 against the action of gravity and the compression spring 16 since the pressure within the standpipe 13 above the plate 3 is that of reactor coolant pump inlet pressure side 36a (i.e. low pressure) which is connected to the standpipe 13 by way of line 37, changeover valve 36, line 39, the annulus between the sleeve 32 and the hollow shaft 21 and liquid pressure vents 35. Thus a pressure differential exists across the plate 3 of the member 1.

To insert the member 1 into the housing 7 the pressure differential across the plate 3 is removed by switching the changeover valve 36 to link line 38 (at the pump outlet pressure) to the standpipe 13. Thus an equality of pressure (pump outlet) exists across the plate 3, and the compression spring 16 and gravity now act to drive the member 1 away from the nosepiece 19 and into the housing 7 (FIG. 5). Ports 6 are large enough to ensure free passage of displaced fluid from below to above the annular plate 3 so as to ensure the fastest possible insertion time.

To withdraw the member 1 from the housing 7 (and so from the core) the shaft 21 is rotated to drive the stem 17 by way of the nut 20 axially downward so that the nosepiece 19 enters into the aperture 4 and closes the ports 6 in the projection 5 of the annular top plate 3 (FIG. 6). The pressure within the standpipe 13 is then reduced by connecting it to the main pump inlet pressure via the changeover valve 36 and line 37. A pressure differential is thus set up across the plate 3 which would drive the member 1 out of the core save for the position of the stem 17. Thus the stem 17 can now be withdrawn upwardly in the standpipe 13 and so the member 1 will be withdrawn from the housing 7, the pressure differential holding the annular plate 3 against the nosepiece 19.

The member 1 can only be withdrawn under the control and at the speed of withdrawal of the stem 17. Also inadvertent switching of the changeover valve 36 to the pump inlet pressure before the stem 17 is motored into engagement with the member 1 will not result in the drawing out of the member 1 from the core 8.

An alternative embodiment of the invention has a long hollow expansion piece at the foot of the stem 17 so that the screw thread portion 18 extends outside the reactor, by way of a pressure gland, when the screw thread portion 18 is fully retracted. Thus the motor 27, 28 and screw thread 18 are maintained in ambient conditions. In such embodiment the changeover valve 36 and its associated pipework 37, 38, 39 can be dispensed with. For the purpose of inserting the neutron absorber portion 2 into the housing 7 the valve defined by nosepiece 19 and ports 6 is open so as to allow highly pressurized fluid to pass through the ports 6 to equalise pressure. Consequently the spring 16 will drive the member 1 into the housing 7. The valve is opened by having a lost motion device between the stem 17 and the motor 27, 28 so that, on operating the lost motion device the reactor operating pressure acts to force the stem 17 (or its extension) clear of the hollow projection 5 so allowing fluid to equalise pressure across the barrier.

The invention is not limited to the particular details described above with reference to FIGURES 1 to 6 of the drawings. Thus the control member 1 may be modified as shown in FIG. 7 in which the ports 6 are shown in the member 1 which is directly joined to the projection 5 carrying the plate 3.

The tubular control member 1 is outwardly flanged at its lower end to link with a carrier 45 having a carrier plate 46 carrying a number of control pins 47 of neutron absorbing material such as boron steel which are insertable between fuel pins 48 (typically comprising uranium dioxide in stainless steel sheaths) of a core fuel element 49. The element 49 has a shroud 50 sealed at its upper end to a tube 51, and the tube 51 is sealed at its upper end to the lower end of the standpipe 13 surrounding the spring 16. At their junction region, the standpipe 13 and tube 51 carry a flanged dashpot orifice plate 52 on which the plate 3 seats, and the carrier 45 has a key 53 slidable in an internal keyway in the tube 51.

It is to be understood that the operation of the FIG. 7 arrangement is essentially the same as described above for the FIGS. 1 to 6 embodiment. Thus, of the primary reactor coolant water flowing upwardly through the fuel element 49 a major portion flows out of ports in the shroud 50 just below the plate 12 whilst some enters the annulus between the control member 1 and the tube 51. With the nosepiece 19 of the stem 17 engaging the projection 5 the ports 6 are effectively closed so that with low pressure in the standpipe 13 the control pins 47 can be moved out of the element 49 by pressure on the underside of the member 1 but at a rate governed by rate of upward withdrawal of the stem 17. With the nosepiece 19 not engaging the projection 5 hydraulic pressure below the member 1 cannot withdraw the control pins 47 from the element 49 since the ports 6 are open and hence there is no significant pressure differential across the plate 3.

FIG. 8 shows an alternative form of drive for the stem 17 which stem is longer than in the FIGURES 1 to 6 embodiment and furthermore instead of having the screw-thread 18 of the FIGURES 1 to 6 embodiment has an integral nut 54 at its upper end above the lid 24. The nut 54 is in engagement with a screw 55 joined to rotate with a shaft 56 to be driven by an electrical motor 57 through a reduction gear 58. The nut 54 has a key 59 slidable in a keyway in a tube 60 which is sealed at its upper end to the gear 58 and at its lower end to a gland tube 61. This tube 61 has a high pressure gland 62 for the stem 17, a finned cooling section 63 between the gland 62 and the lid 24 and is sealed at its lower end to the lid. Inside the lid 24 a sealing sleeve 64 sealed to the lower end of the tube 61 seals with the standpipe 13.

The mechanisms described above with reference to the drawings are designed to be inherently safe in operation. Movement of the member 1 in a direction away from the position of maximum control effect (i.e. the position in which the portion 2 is fully inserted in the core 8 or the control pins 47 are fully inserted between the fuel pins 48) is only possible at a rate governed by the rate of movement away from this position of the mechanical restraining means in the form of the stem 17 and nosepiece 19. In other words the pressure difference across the member 1 causing movement away from this position can only be generated when the nosepiece 19 is in engagement with the member 1 in such a manner as to close effectively the ports 6.

The embodiment of FIGURE 7 illustrates the versatility of application of the control mechanism of the invention, whilst in the FIGURE 8 embodiment the nut and screw drive mechanism of the restraining means is located outside the pressure vessel and contact with water at high temperature and high pressure is reduced by the arrangement of finned cooling section and gland above the pressure vessel lid.

We claim:
1. A control mechanism for a nuclear reactor using a pressurized coolant, the mechanism comprising a movable reactivity control member, first means for causing the control member to move to a reactivity reducing position at a first rate, second means for causing the member to move from said position in a reactivity-increasing direction under the influence of a force created by a pressure difference across the member and at a second rate slower than the first rate, said second means comprising restraining means movable into abutting engagement with said control member on a side thereof opposite to that on which said force is to act for rendering said force effective to move the control member from said position when in abutting engagement with said control member and for rendering said force ineffective to move said control member from said position when free of engagement with said control member.

2. A mechanism as claimed in claim 1, wherein the first means comprises a spring acting between the control member and a fixed support.

3. A mechanism as claimed in claim 1, wherein the control member has ports and the restraining means comprises a plug for engagement with the member effectively to close the ports.

4. A mechanism as claimed in claim 1, wherein the restraining means is movable by a nut and screw drive mechanism.

5. A mechanism as claimed in claim 1, wherein the control member has a tubular portion of neutron absorbing material insertable in a housing of a reactor core.

6. A mechanism as claimed in claim 1, wherein the control member carries a number of control pins of neutron absorbing material insertable between fuel pins of a fuel element.

References Cited
UNITED STATES PATENTS

| | | | |
|---|---|---|---|
| 2,898,281 | 8/1959 | Untermyer et al. | 176—36 |
| 3,031,397 | 4/1962 | Fortescue et al. | 176—36 |
| 3,089,836 | 5/1963 | Wootton | 176—50 |
| 3,154,472 | 9/1964 | Shannon | 176—36 |

OTHER REFERENCES

AEC Document MND–M–1815, 1960, pages II–10 and II–11.

Schultz: "Control of Nuclear Reactors and Power Plants," 1955, page 114.

CARL D. QUARFORTH, *Primary Examiner.*

L. DEWAYNE RUTLEDGE, *Examiner.*

H. E. BEHREND, *Assistant Examiner.*